US009852471B2

(12) United States Patent
Marquardt et al.

(10) Patent No.: US 9,852,471 B2
(45) Date of Patent: *Dec. 26, 2017

(54) SYSTEMS, METHODS, AND COMPUTER-READABLE MEDIA FOR ELECTRONIC REPORT TRACKING

(71) Applicant: Giesecke & Devrient Currency Technology America, Inc., Dulles, VA (US)

(72) Inventors: Scott Marquardt, Dulles, VA (US); Roy Dunlap, Berryville, VA (US)

(73) Assignee: Giesecke+Devrient Currency Technology, America, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,035

(22) Filed: Apr. 22, 2016

(65) Prior Publication Data

US 2016/0253751 A1 Sep. 1, 2016

Related U.S. Application Data

(63) Continuation of application No. 14/634,155, filed on Feb. 27, 2015.

(51) Int. Cl.
*G06Q 40/02* (2012.01)
*G06Q 50/26* (2012.01)
(Continued)

(52) U.S. Cl.
CPC .............. *G06Q 40/02* (2013.01); *B65H 7/02* (2013.01); *B65H 7/20* (2013.01); *G06Q 50/26* (2013.01);
(Continued)

(58) Field of Classification Search
CPC ...... G07D 7/0006; G07D 7/0033; G07D 7/12; G07D 7/124; G07D 7/06; G07D 7/20;
(Continued)

(56) References Cited

U.S. PATENT DOCUMENTS 3,951,264 A 4/1976 Heicecker et al.
4,906,988 A 3/1990 Copella
(Continued)

OTHER PUBLICATIONS

United States Patent and Trademark Office, Non-Final Office Action issued in related U.S. Appl. No. 14/634,241, mailed Mar. 24, 2016.
(Continued)

*Primary Examiner* — David H Bollinger
(74) *Attorney, Agent, or Firm* — Drinker Biddle & Reath LLP

(57) ABSTRACT

Exemplary embodiments are disclosed herein for processing one or more sheets of sheet material in a deposit include various systems and processes. The systems and processes include receiving a sheet in a sheet-accepting device. Further, the systems and processes include detecting, by a sensor, characteristic information about the sheet. The characteristic information indicates whether the sheet is anomalous. The systems and processes also include encoding, by an encoding device, the sheet based on the characteristic information detected by the sensor. The encoding includes encoding the sheet with anomaly information when the characteristic information indicates that the sheet is anomalous. The anomaly information identifies a reason for indicating that the sheet is anomalous. Moreover, the systems and processes include disposing the encoded sheet in a container for further processing when the characteristic information indicates that the sheet is anomalous.

15 Claims, 10 Drawing Sheets

(51) Int. Cl.
    *G07D 11/00*     (2006.01)
    *B65H 7/02*     (2006.01)
    *B65H 7/20*     (2006.01)
    *G07D 7/06*     (2006.01)
    *G07D 7/00*     (2016.01)

(52) U.S. Cl.
CPC ............... *G07D 7/003* (2017.05); *G07D 7/06* (2013.01); *G07D 11/0006* (2013.01); *G07D 11/006* (2013.01); *G07D 11/0033* (2013.01); *G07D 11/0066* (2013.01); *G07D 11/0075* (2013.01); *G07D 11/0084* (2013.01); *G07D 11/0096* (2013.01)

(58) Field of Classification Search
CPC ............. G07D 11/0033; G07D 11/009; G07D 11/0096; G07D 2207/00; G07D 2211/00; G06Q 40/02; G06Q 50/26
See application file for complete search history.

(56) References Cited

U.S. PATENT DOCUMENTS

| | | | |
|---|---|---|---|
| 6,237,739 | B1 | 5/2001 | Mazur et al. |
| 6,782,987 | B1 | 8/2004 | Abe et al. |
| 7,201,320 | B2 | 4/2007 | Csulits et al. |
| 7,441,712 | B2 | 10/2008 | Silverbrook et al. |
| 8,011,581 | B1 | 9/2011 | Folk et al. |
| 8,627,939 | B1 | 1/2014 | Jones |
| 2004/0222283 | A1 | 11/2004 | Mastie et al. |
| 2005/0006198 | A1 | 1/2005 | Yoshioka et al. |
| 2005/0010525 | A1 | 1/2005 | Ross et al. |
| 2005/0207634 | A1 | 9/2005 | Jones et al. |
| 2008/0159587 | A1 | 7/2008 | Rhoads |
| 2013/0093175 | A1 | 4/2013 | Appavu et al. |
| 2015/0154473 | A1 | 6/2015 | Shimakata et al. |
| 2015/0235188 | A1 | 8/2015 | Chugo |

OTHER PUBLICATIONS

United States Patent and Trademark Office, Office Action in counterpart U.S. Appl. No. 14/634,155, issued Oct. 20, 2016.
International Searching Authority, International Search Report and Written Opinion in PCT/US2016/018792, mailed Jun. 1, 2016.
International Searching Authority, International Search Report and Written Opinion in PCT/US2016/018789, mailed Jul. 6, 2016.
United States Patent and Trademark Office, Office Action in counterpart U.S. Appl. No. 14/634,241, filed Nov. 2, 2016.
United States Patent and Trademark Office, Office Action in counterpart U.S. Appl. No. 14/634,155, filed Mar. 2, 2017.
United States Patent and Trademark Office, Final Office Action in counterpart U.S. Appl. No. 14/634,241, filed Apr. 14, 2017.
International Searching Authority, International Preliminary Report on Patentability in counterpart International Patent Application No. PCT/US2016/018792, dated Sep. 8, 2017.
International Searching Authority, International Preliminary Report on Patentability in counterpart International Patent Application No. PCT/US2016/018789, dated Sep. 8, 2017.

SYSTEMS, METHODS, AND COMPUTER-READABLE MEDIA FOR ELECTRONIC REPORT TRACKING

CROSS-REFERENCE TO RELATED APPLICATION

This application is a Continuation of U.S. patent application Ser. No. 14/634,155, filed on Feb. 27, 2015, which is related to U.S. patent application Ser. No. 14/634,241, filed on Feb. 27, 2015, the disclosures of each of which are incorporated herein by reference in their entirety.

TECHNICAL FIELD

The present disclosure relates generally to accounting, and more specifically to systems, methods, and computer-readable media for sheet material processing and account reconciliation.

BACKGROUND

In currency processing systems, if the system determines that banknote or other currency objects cannot be read properly, is damaged, is counterfeit, or is otherwise unfit for continued circulation, the system will generally reject the banknote or currency object for a human to perform a second review of the note. In order to maintain deposit integrity and ensure that the original deposit account is credited for that note, the system must keep track of which account that note is associated with. This is currently done one of two ways. Some systems stop the machine after processing each deposit, and have a human review each note in that deposit and reconcile the account that deposit came from. This causes a labor intensity problem and causes a loss in productivity. Other systems continue running the machine and use physical separators inserted between each deposited set of notes in the rejected-note container in order to keep track of what account those rejected notes were associated with. These physical separators can take the form of header cards, trailer cards, input package barcodes. The currency processing machine will recognize the physical separators as identifying the beginning of a new deposit during processing, and will identify with which account the sequentially following sheets are associated.

The Cash Cycle describes what happens to currency from printing to destruction. Currency, a subset of currency objects, is created and distributed by Central Banks (and similar authorities), enters circulation, is used and reused many times, and eventually reaches a point where it is worn or soiled and must be replaced with a new note. This also is true for other currency objects such as Food Coupons, Casino Vouchers, Cash-Out Tickets and other types of currency objects used in commerce.

For example, currency (also known as banknotes) are dispensed, carried, spent, stored, exchanged and transported. They are transported in bulk from places of excess buildup, such as retailers, to more secure locations, such as Cash in Transport (CIT) facilities, bank vaults, etc. Whenever notes are aggregated, they must be sorted and counted. In virtually all places where any reasonable volume must be counted, this is done with machines of varying levels of speed and sophistication.

In the past several decades, the use of machines to count, sort and validate currency has expanded significantly in terms of both quantity and breadth of functionality. Some machines are used to count, sort, authenticate, capture serial numbers, evaluate fitness and even destroy banknotes (where this is authorized) at speeds up to or exceeding 44 banknotes per second.

One area of currency object processing that has not kept pace with other advancements in the field has been the handling and reconciliation of "rejects;" that is, currency objects that cannot be properly counted and sorted with automated equipment. Accordingly, there is great need for improvement in the handling and reconciliation of rejects and, to some extent, a reduction in human interaction with the banknotes, thus reducing the opportunity for mistakes or theft.

Further, the currency processing system will reject notes for many reasons, including the note being unreadable by the system because the note is, for example, torn, folded, heavily damaged, or glued together. The system also rejects notes because the system determines that the note may be counterfeit, or because the note should be shredded. Physical separators generally do not specify the reason that each note is rejected, but rather separates rejected notes from different accounts. Thus, a secondary human inspection is required to determine the cause of the note being rejected and what should be done with the note as a result. This again results in a labor intensity problem and corresponding loss of productivity.

SUMMARY OF INVENTION

According to aspects of the present disclosure, methods, systems, and media disclosed herein for processing one or more of a plurality of sheets of sheet material in a deposit include various systems and processes. The systems and processes include receiving one or more sheet of the plurality of sheets in a sheet-accepting device. Further, the systems and processes include detecting, by at least one sensor, characteristic information about the one or more sheet. The characteristic information indicates whether the one or more sheet is anomalous. The systems and processes also include encoding, by an encoding device, the one or more sheet based on the characteristic information detected by the sensor. The encoding the one or more sheet includes encoding the one or more sheet with anomaly information when the characteristic information indicates that the one or more sheet is anomalous. The anomaly information identifies a reason for indicating that the one or more sheet is anomalous. Moreover, the systems and processes include disposing the encoded one or more sheet in a container for further processing when the characteristic information indicates that the one or more sheet is anomalous.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Figure 1:
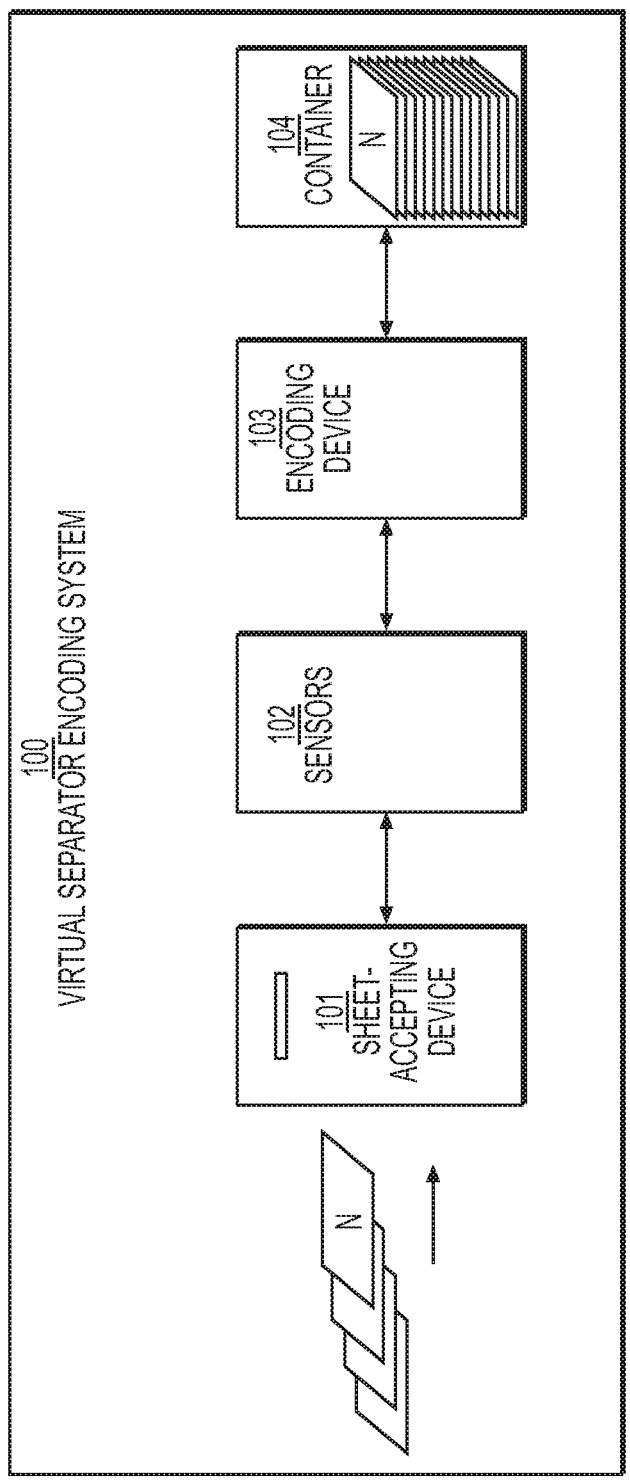
FIG. 1 is a block diagram of an exemplary virtual separator encoding system according to particular embodiments.

The systems, methods, and media of the invention are suitable for use with and may incorporate various components of the systems and methods disclosed in U.S. patent application Ser. No. 14/260,744, filed on Apr. 24, 2014, U.S. patent application Ser. No. 14/046,621, filed on Oct. 4, 2013, patent application No. PCT/EP2008/008991, filed on Oct. 23, 2008; U.S. Pat. No. 7,377,423 B2, published on May 27, 2008; U.S. Pat. No. 7,131,593 B2, published on Nov. 7, 2006; and U.S. Pat. No. 6,955,263, published on Oct. 18, 2005, the disclosures of which are hereby incorporated by reference in their entirety. Although many of the exemplary embodiments disclosed herein, as well as in these disclosures, are directed toward banking and accounting, the invention disclosed herein is not limited to applications in the field of banking and accounting, but rather is applicable to a wide range of applications in the financial services industry and beyond, including, but not limited to, retail banking, retail commerce, currency exchanges, law enforcement, central banking, clearing houses and processing of commercial paper, accounting, auditing, casino operations, gaming, transit agency operations, and many other fields.

Certain currency processing systems use physical separators inserted between each deposited set of notes in a rejected-note container in order to keep track of which account those rejected notes were associated with. The physical separators often take the form of header cards, trailer cards, band strap images, or input package barcodes. An input package comprises a deposit that is presented for processing at the currency processor system. An input package may vary in physical number of objects it contains or it may be uniform in size. When the physical separator is placed in the currency processing system, the system reads the information stored on the physical separator, such as account information, and associates notes that sequentially follow the physical separator with a particular account identified in the account information. The use of physical separators in reject-note containers, however, result in increased occurrences of mechanical malfunctions, including machine jams and hardware failures, and operator errors while handling the rejected notes and physical separators. The occurrences can alter the sequential ordering used to identify a particular account, resulting in loss of deposit integrity and account discrepancies. In addition, because the reason that each particular note was rejected is not tracked, every note often undergoes a secondary human inspection, which results in a labor intensity problem and a loss of productivity.

Existing systems of currency object validation and reconciliation make reject handling complicated, manually intensive, and prone to mistakes and loss. Some of the challenges include:

1. The rejected currency objects must be handled manually—sometimes several times.
2. Currency objects from a single deposit must be segregated by deposit so that proper reconciliation can take place.
3. To prevent systematic theft, reconciliation is often done by persons other than the original machine operator so that losses cannot be "pushed forward."

Currency objects refer to true currency bank notes as well as objects that represent a monetary value.

To address these and other challenges, several schemes have been employed for keeping rejects separated by deposit. One uses "header cards" at the beginning of each deposit; a second uses "trailer cards" inserted at the end of each deposit. Both header and trailer cards serve as separators and are sent to a reject bin so that all subsequent rejects can be associated properly with the header/trailer card deposit. Another scheme uses a "reel" of film which captures all rejected notes from a single deposit and then "winds them" them into the reel.

Once the rejects are properly segregated, they can then be taken to a "reconciliation station" where the header/trailer card or reel compartment identifies the input deposit and the associated banknotes can then be processed and results merged back to the processing system deposit information totals.

A number of things can go wrong in these reconciliation processes (for example, physical handling—dropping or mixing together of several deposits worth of rejects and header cards onto the floor intermixed) and at best it is a slow, often manual process which is prone to human error.

Some banknote processing equipment contain a number of sensors that capture different types of banknote features during processing. In some applications, the information captured is used in real-time to determine the fate of the note (e.g., recycling, destruction or reject) and only summary data are captured from the sensors for use off-line.

Improvements in both data communications and data storage allow more information to be extracted from each note processed (for example, image, serial number, sensor results, etc.). A complete data profile for each note processed can create a huge amount of data (terabytes/hour), perhaps more than a high-resolution video camera that uses data compression to reduce the redundant data in each frame. But for banknote reconciliation, compression is not required if each note is considered unique.

The sensors used for processing banknotes perform a variety of functions. For example, an image sensor may examine a note under various wavelengths of light, looking for the presence/absence of visual features and other complex tasks. The output of an image sensor can be as much as 10 MB (or more) per note, for example. A banknote processing machine makes use of the various sensor outputs using one (or more) pre-determined formulas that can be "fine-tuned" according to the circumstances. For example, the destruction of "soiled" notes can be determined according to the "clean money" policy of the Central Bank. Because every shredded note must be replaced with a newly printed banknote, the economics of banknote destruction play a role in each country. But in summary, as the data captured (or potentially captured) by the sensor "suite" has increased, technology may allow for improvements such that it is feasible to capture an expanded set of data for every banknote processed.

Central Banks can collect serial number information capture via Banknote Processing Equipment. Serial number capture has been available for most currencies in high-speed equipment for some years now. Serial numbers are used to determine banknote age, origin (and distance from origin), frequency of processing (for example, tracking the number of times the same bill has been processed), etc. Serial numbers are also captured for notes destroyed so that if a banknote re-appears with the same number, an investigation as to authenticity/counterfeit can be requested.

How can the capture and storage of individual banknote sensor information help in banknote processing and, more specifically, in the handling and management of rejects?

Each banknote, by definition, is unique. This is at least coming from a unique serial number, but because each note has traveled a different route to its ultimate inclusion in a deposit being processed, there will be subtle differences among the notes.

Rejected banknotes and other currency objects are typically in poor physical condition, such notes possibly being heavily soiled, stained, torn, limp, perhaps with holes, tape and folded corners. These rejected notes may also have problems due to their physical conditions that cause issues when fed into the processing system that results in excessive skew and/or multiple notes feeding in together at the same time.

Poor note condition makes it very difficult to find the unique identifying features (such as, for example, serial numbers, coupon numbers, etc.) of every currency object processed by the system so that the deposit integrity can be ensured. This then drives the need for a physical separator between the rejected objects for every input deposit.

Accordingly, particular configurations of the present invention address these and other problems by detecting characteristic information about the sheet (e.g., serial number, value of the sheet, other unique markings, accounting information, deposit information) existing on the sheet material (e.g., currency, commercial tickets, banknotes, checks, other sheets of value) and based on the characteristic information about the sheet, if the information indicates that the sheet is anomalous (e.g., deformed, torn, damaged in other ways, improperly-sized, folded, stuck to another sheet, missing elements, composed of unexpected materials or elements, counterfeit, unreadable by the machine), encodes the sheet with anomaly information (e.g., indicates the nature of the anomaly, indicates the existence of an anomaly). Thus, the need for physical separators in the reject-note container and while processing the rejected notes can be eliminated in particular configurations. Further, the overall use of physical separators among all phases of currency processing, including loading for initial processing as well as during rejection-handling, can be greatly reduced or eliminated entirely. Even further, the need for a secondary human inspection of each sheet can be eliminated for some or all sheets. Consequently, particular configurations of the present invention permit faster, more efficient, less costly sheet-processing, and fewer accounting discrepancies because the need for physical separators has been eliminated. In addition, particular configurations of the present invention allow for less human interaction by eliminating or significantly reducing the need for a secondary human inspection for some or all sheets, at least because each sheet is separately encoded with anomaly information. Also, particular configurations of the present invention eliminate the physical efforts required to handle and maintain an awkward or heavy reel device.

Configurations of the present disclosure may address these and other areas of concern to allow each rejected currency object to be uniquely identified and, therefore, reduce or eliminate the need for a physical separator between rejected objects of each input deposit processed. Eliminating the requirement to feed, transport and stack the separators increases the overall currency object processing throughput for the customer allowing increased productivity. The removal of the physical separator for reject handling further saves the customer the high expense of the re-occurring costs for the header/trailer card or reject reel materials, as a typical one shift process at a high volume Central Bank processing system can require up to 10,000 header or trailer cards per run, and these cards can have less than a one month life cycle.

Particular configurations of the present invention further address these and other problems by detecting the anomaly information on the sheet and, based on the anomaly information, determining whether to reconcile an account associated with the accounting information about the sheet, associating accounting information with an account in response to determining whether to reconcile the account, and reconciling the account based on deposit information about the sheet. Thus, particular configurations of the present invention reduce accounting discrepancies with less human interaction because the currency processing system reconciles the account based on the anomaly information encoded on the sheet. Particular configurations of the present invention improve the handling and reconciliation of rejects and, as an added benefit, reduce human interaction with the banknotes and therefore create less opportunity for mistakes or theft.

Exemplary configurations of the present invention provide methods, systems, and non-transitory computer-readable media for sheet material processing and accounting. Particular configurations of the present invention, and their features and advantages, may be understood by referring to FIGS. 1-10, like numerals being used for corresponding parts in the various drawings. It is to be understood that processes performed by the various devices described herein and shown in FIGS. 1-10 are not limited to the particular order of steps described herein, and the order of such steps may be rearranged where possible. Further, certain steps described herein may be performed in parallel, omitted, or performed multiple times where appropriate.

FIG. 1 shows an exemplary virtual separator encoding system 100 in accordance with certain configurations of the present invention. Virtual separator encoding system 100 comprises a sheet-accepting device 101, sensors 102, an encoding device 103, and a container 104.

Sheet-accepting device 101 is configured to receive one or more sheets N of sheet material, examples of which include: currency, banknotes, tickets, vouchers, checks, and other commercial or governmentally issued monetary instruments. In some configurations, the sheets N of sheet material include sheets that contain input package identifiers, such as, for example, a header card, a trailer card, a band strap image, and an input package barcode. Examples of machines employing sheet-accepting devices 101 include, for example: currency-counting machines, check scanners, automated-teller machines, vending machines, ticket-redemption machines, change machines, table game bill acceptors, slot machines, and other mechanisms that accept sheets N of value.

Sensors 102 are configured to detect characteristic information about sheets N, including one or more of: serial numbers of sheets N, value or denomination information of sheets N, series of sheets N, physical attributes of sheets N, total number of sheets N or of particular groups of sheets N, and the input package identifier, accounting information about the sheets N contained in the input package, deposit information, and accounting information, and other identification related to sheets N. In some configurations, the input package identifier or accounting information may be detected from a header card, a trailer card, a band strap image, or an input package barcode. In other configurations, the input package identifier or accounting information is indexed to metadata associated with a particular image file or other characteristic information about the sheet. In other such configurations, the use of a header card, a trailer card, a band strap image, or an input package barcode is eliminated entirely. In some configurations, sensors are configured to detect only some of this information. In certain configurations, only one sensor 102 is incorporated into system 100. In other configurations, a plurality of sensors 102 are incorporated into system 100. In particular configurations, sheet-accepting device 101 includes sensors 102. In some configurations, sensors 102 are built into the same device as the sheet-accepting device 101. In certain configurations, sheet-accepting device 101 and sensors 102 are separate but configured to communicate therebetween. Examples of sensors 102 include one or more of: an optical sensor, a magnetic sensor, a radio-frequency identification ("RFID") sensor, an ultraviolet sensor, a mechanical sensor, a virtual sensor, and an infrared sensor.

Encoding device 103 is configured to encode the sheet based on the characteristic information about the sheet. When the characteristic information about the sheet indicates that the sheet is anomalous (e.g., the sheet cannot be detected by sensors 102, sensors 102 detect that the sheet is torn, folded, bent, glued to another sheet, heavily damaged, or counterfeit), the encoding device is configured to encode the sheet with information about the sheet, including, for example, anomaly information, deposit information, and accounting information. The anomaly information may include, for example, the reason that the system indicated the sheet as anomalous, a flag indicating that the sheet requires further processing. Examples of encoding device 103 include one or more of: a printer including a laser printer and an ink printer, a hole puncher, a device using software to write a character to memory, a laser, a computer, and a writing utensil, including a pen, a pencil, a highlighter, a punch, a stamp, an embosser, a marker, and any other device capable of encoding a sheet at speeds required by the virtual separator system, such as, for example, speeds of one to fifty sheets per second or greater.

Container 104 is a container configured to receive the sheet. Container 104 need not have physical separators or separate compartments, but in some configurations physical separators or separate compartments are used, for example for organization or storage reasons. Container 104 may receive sheets indicated as rejected (e.g., sheets encoded with anomaly information, sheets with anomalies detected by sensors 102, sheets randomly selected for further evaluation). In certain configurations, for example, container 104 is a system of containers, integrated or separate, configured to receive and separate rejected sheets from accepted sheets. In some other configurations, container 104 is a system of containers configured to sort sheets with particular anomaly information into a particular container. In yet other configurations, container 104 is compartmentalized and configured to sort sheets with particular anomaly information into a particular compartment of the container. In some configurations, container 104 is a pocket.

In some configurations, for example, one or more of sheet-accepting device 101, sensors 102, encoding device 103, and container 104 are linked by transport mechanisms such as belts, pneumatic conveyors, or other conveying mechanisms configured to transport sheet materials such as currency notes between or within the devices. The transport path between each device can be short and straight to minimize the possibility of jamming or misfeeding. Open areas can be included in the transport paths to provide access to sheets and to permit imaging of both sides of a sheet.

In some other configurations, for example, one or more of sheet-accepting device 101, sensors 102, encoding device 103, and container 104 are included within a single exterior housing having a display and an input device for inputting data or commands (not depicted). In some yet other configurations, one or more of sheet-accepting device 101, sensors 102, encoding device 103, and container 104 are the same device.

Figure 2:
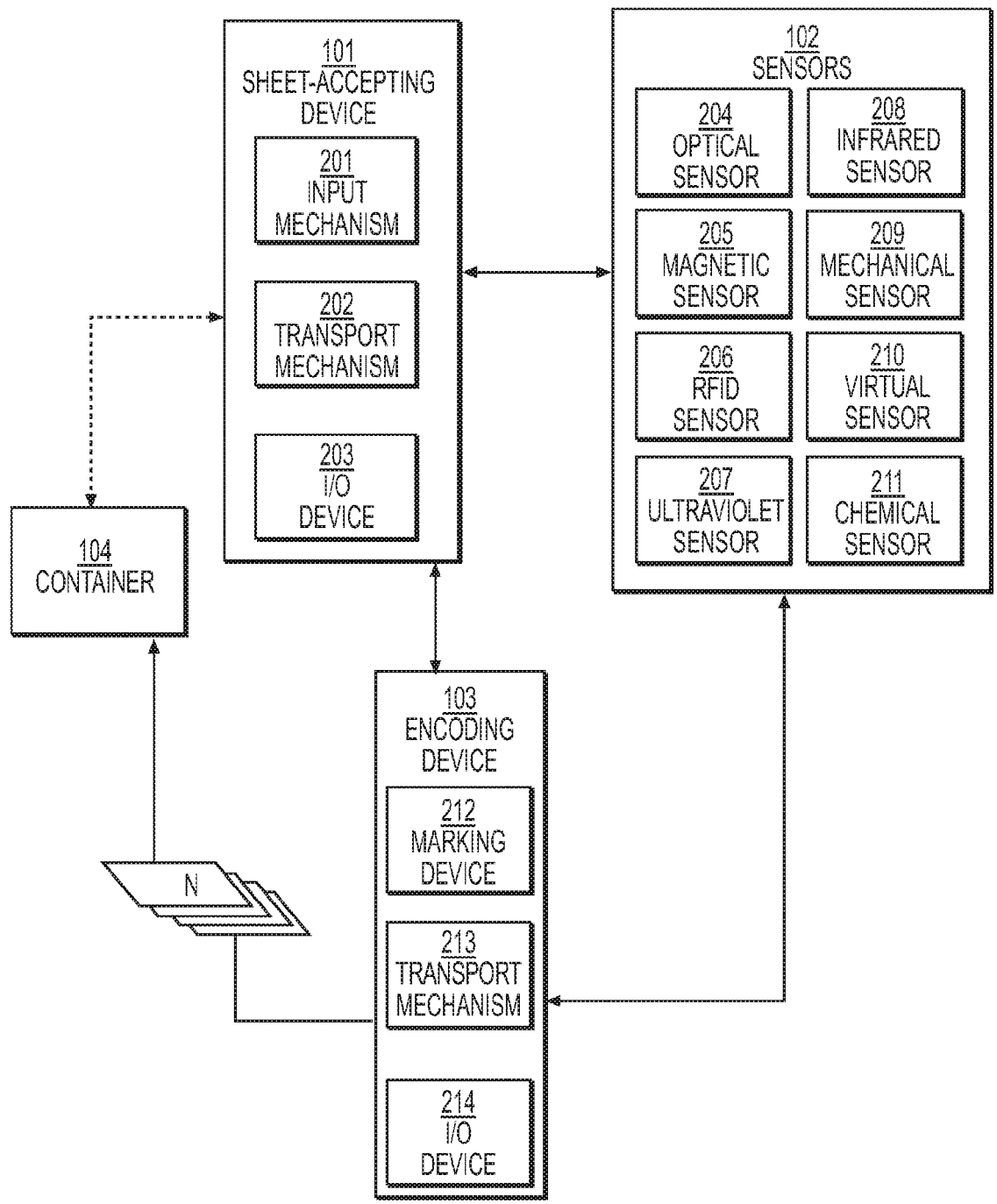
FIG. 2 is a schematic representation showing exemplary communications between a sheet-accepting device, a sensor comprising a plurality of sensing devices, an encoding device, and a container, in a virtual separator encoding system according to particular embodiments.

FIG. 2 shows exemplary detail for sheet-accepting device 101, sensors 102, encoding device 103, and container 104, and each device's ability to communicate with each other. Sheet-accepting device 101 includes an input mechanism 201 configured to receive a sheet N therein. In particular configurations, input mechanism 201 is a slot with rollers configured to transport sheets N inserted therein into sheet-accepting device 101. Further, sheet-accepting device 101 includes a transport mechanism 202, which may be a series of rollers or other elements suitable for transporting a sheet N, configured to transport sheets N to sensors 102 (e.g., a first sensor) and encoding device 103. In particular configurations, input mechanism 201 is configured to accept a plurality of sheets N at once and at least one of input mechanism 201 and transport mechanism 202 is configured to separate the plurality of sheets N, so that only one sheet N at a time is transported to sensors 102. In this manner, sensors 102 are able to accurately detect information of all of the plurality of sheets N.

When transport mechanism 202 transports a sheet N to sensors 102, sensors 102 detect characteristic information about sheet N. The characteristic information about sheet N includes, for example, a serial number and a value (e.g., denomination) of sheet N; as well as other information including, for example, a series of sheet N; physical attributes of sheet N including dimensions, weight, opacity, and texture; and the presence of other identifiers, such as magnetic strips, ink, bar codes or other recognition patterns, holograms, punch marks, and RFID circuits. Other marking mediums may be present on sheet N, including both visible marks and marks not visible to the human eye, including ultraviolet markings or infrared markings. In particular configurations, sensors 102 include, for example: an optical sensor 204, a magnetic sensor 205, an RFID sensor 206, an ultraviolet sensor 207, an infrared sensor 208, a mechanical sensor 209, a virtual sensor 210, and a chemical sensor 211.

Optical sensor 204 may be a camera or scanner, for example, that records an optical image of each sheet N, which is thereafter processed by sheet-accepting device 101 or encoding device 103 or transmitted to another device for processing to extract at least a portion of the information of the sheet. In particular configurations, for example, sheet-accepting device 101 is able to determine at least the serial number and value of sheet N from the optical image of sheet N internally or at a remote device. Magnetic sensor 205 detects magnetic ink or magnetic features on sheet N that provide information of sheet N, such as a magnetic strip that identifies the denomination of currency or magnetic ink that identifies account and routing numbers on checks. Because sheets N may not be appropriately separated during processing, magnetic sensor 205, which is able to detect magnetic signals through a plurality of overlapped sheets N, provides redundancy for obtaining information that is difficult for optical sensor 204 to obtain when sheet-separating errors occur. RFID sensor 206 detects RFID circuits on sheet N that also provides information of sheet N and provides further redundancy for optical sensor 204. Ultraviolet sensor 207 detects ultraviolet markings on sheet N that also provides information of sheet N and provides further redundancy for optical sensor 204. Similarly, infrared sensor 208 detects infrared markings on sheet N that also provide information of sheet N and provides further redundancy for optical sensor 204. Mechanical sensor 209 detects mechanical properties of sheet N that also provides information of sheet N and provides further redundancy for optical sensor 204. Virtual sensor 210 virtually detects properties and characteristics of sheet N that provide information about sheet N and provides redundancy for optical sensor 204. Chemical sensor 211 detects chemical properties of sheet N that also provides information about sheet N and provides redundancy for optical sensor 204. In some configurations, sensors 102 include only one of optical sensor 204, magnetic sensor 205, RFID sensor 206, ultraviolet sensor 207, infrared sensor 208, mechanical sensor 209, virtual sensor 210, and chemical sensor 211. In other configurations, sensors 102 include various combinations of optical sensor 204, magnetic sensor 205, RFID sensor 206, ultraviolet sensor 207, infrared sensor 208, mechanical sensor 209, virtual sensor 210, and chemical sensor 211 and other sensors able to detect information of sheets N.

In some configurations, sensors 102 are configured to detect reconciliation information about the sheet, including one or more of deposit information about sheet N, including how many sheets are associated with a particular account, and accounting information about sheet N, including with which account an input package identifier is associated.

After sensors 102 have detected the characteristic information about sheet N, if the characteristic information detected by sensors 102 indicates that the sheet is anomalous, transport mechanism 202 transports sheet N to encoding device 103 that includes a marking device 212 configured to encode the sheet. Further, encoding device 103 includes a transport mechanism 213, which may be a series of rollers or other elements able to transport a sheet N, configured to transport sheets N to a container 104. Encoding device 103 is configured to encode the sheet based on the characteristic information about the sheet. When the characteristic information about the sheet indicates that the sheet is anomalous, for example if the sheet cannot be detected by sensors 102, the sheet is torn, folded, bent, glued to another sheet, heavily damaged, or counterfeit, encoding device 103 is configured to encode the sheet. The sheet may be marked with anomaly information, including for example the reason that the system indicated that the sheet is anomalous, which flags the sheet for further processing. Further processing includes, for example, disposing of the sheet, shredding the sheet, running the sheet through the virtual separator encoding system a second time, reconciling an account based on the sheet, contacting authorities because the sheet is counterfeit, imaging the sheet for processing in software, and further human inspection.

In certain configurations, serial number data is assessed against a counterfeit registry for verification at various times during sheet-processing and handling. As used herein, the term "serial number" corresponds to a specific marking on or in the sheet that identifies a particular sheet of the sheet material. For example, if identical serial numbers are processed within a specific period of time (e.g., 24 hours), then a monitoring system may be activated (e.g., E-Connect) to observe the flow of the suspect sheets (e.g., counterfeit currency, counterfeit commercial tickets, counterfeit banknotes, counterfeit checks, other counterfeit sheets of value). Using the data collected, an origin of such suspect sheets can be traced to a particular asset on a particular date at a particular time, and the subsequent flow of such suspect sheets through, for example, a casino or a financial institution can be tracked.

In some configurations, encoding device 103 is configured to encode the sheet with reconciliation information about the sheet, including one or more of deposit information about sheet N, including how many sheets are associated with a particular account, and accounting information about sheet N, including with which account an input package identifier is associated.

In some configurations, encoding device 103 is configured to encode the sheet with a random marking, which can be matched up to a data stream. In some configurations, encoding device 103 is configured to encode the sheet with a significant marking, which can relate to a specific failure code.

In some configurations, encoding device 103 is configured to encode the sheet by marking the sheet with a physical marking. The physical marking may take the form of a recognition pattern, including a code pattern, a barcode, a dot matrix, a dot pattern, one or more dots, one or more lines, a vertical bar, words, numbers, symbols, and any other encoding scheme that is suitable to function in a system with transport speeds of one to fifty sheets per second or greater. In some configurations, encoding device 103 is configured to encode the sheet using a means for altering a surface of the sheet, including for example, hole-punching, cutting, folding, embossing, engraving, or etching the sheet. In some configurations, encoding device 103 is configured to encode the sheet using a marking medium that is visible to the human eye, including color ink, black ink, gel ink, phosphorescent fluids, other fluids, paint, and burn marks. In some configurations, encoding device 103 is configured to encode the sheet using a marking medium that is not visible to the human eye, including RFID markings, ultraviolet markings, and infrared markings. In some configurations, encoding device 103 is configured to apply a marking medium to both a first side of the sheet and a second side of the sheet.

In some configurations, encoding device 103 is configured to encode the sheet using a non-physical marking process. In such configurations, for example, encoding device 103 further comprises a memory that is configured to store in the memory one or more of the characteristic information about the sheet, the anomaly information about the sheet, the accounting information about the sheet, the deposit information about the sheet, image data of an image of the sheet, and metadata of the image of the sheet. In particular configurations, the memory is an RFID tag. In other exemplary configurations, the memory is one or more of a solid state memory component, a hard drive, a magnetic tag or component, and an optical marking.

In some configurations, the means used to encode the sheet can be associated with the optical image of the currency object itself with respect to a unique identifier. For example, a bank note serial number detected by a optical image sensor can associated with a bar code on the bank note itself to further strengthen the integrity link between the bank note and the deposit input package from which it was processed.

In some configurations, encoding device 103 also includes a memory writing device, such as an RFID tag, and an input/output ("I/O") device 214. The memory writing device is configured to write information to the memory coupled to encoding device 103. In exemplary configurations, the memory writing device is one or more of a magnetic encoder, a printer, a wireless or hard-wired interface with the memory, an RFID tag, and any other device able to write information to the memory. I/O device 214 is configured to provide a communications interface between encoding device 103 and other devices, particular databases, and other devices involved in monitoring, controlling, managing, accounting, and auditing processes.

After encoding device 103 has encoded sheet N, transport mechanism 213 transports sheet N to container 104. In some configurations, transport mechanism 213 is the same as transport mechanism 202. In some configurations, container 104 is permanently affixed to sheet-accepting device 101. In other configurations, container 104 is a removable container that can be separated from sheet-accepting device 101, and container 104 is able to be sealed and locked, so that the sheets N disposed therein may not be tampered with or removed during transport.

In some configurations, sheet N is encoded with information indicating why sheet N was rejected and sent to container 104, for example a rejection pocket that holds sheet N to be reprocessed or reconciled during a secondary process. For example, sheet N does not meet the sensor evaluation criteria to correctly designate sheet N as "fit," "unfit," or "shred" objects, sheet N can be marked with a coded pattern identifying all depositor and reject information associated with sheet N and sent to a reject pocket to await further processing. This allows all rejected currency objects to be contained together without the need for any physical separator or overall required sequence.

Each sheet N that has not been encoded (e.g., because sheet N is not anomalous) does not get transported to container 104, but rather is transported to another location separate from container 104 for further processing or storage. For example, each encoded sheet N that has been transported to container 104 need not have any physical separator between each sheet N in in container 104, such that each encoded sheet N can touch an adjacent sheet N. In alternative configurations, one or more physical separators may be used to separate each sheet N or a particular group of sheets N in container 104.

Figure 3:
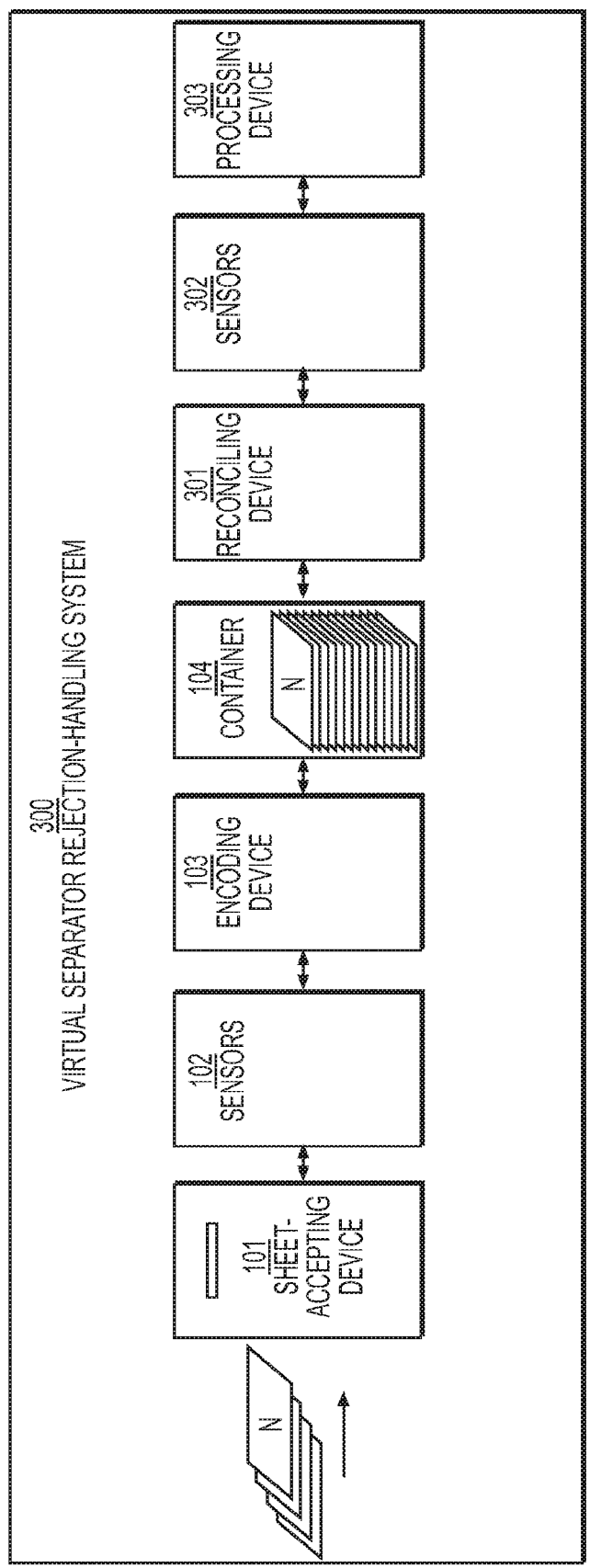
FIG. 3 is a block diagram of an exemplary virtual separator rejection-handling system according to particular embodiments.

FIG. 3 shows an exemplary virtual separator rejection-handling system 300 in accordance with certain configurations of the present invention. Virtual separator rejection-handling system 300 comprises sheet-accepting device 101, sensors 102, encoding device 103, and container 104, as depicted in FIG. 1 and FIG. 2, and further comprises a reconciling device 301, sensors 302, and a processing device 303.

Reconciling device 301 is configured to receive one or more sheets N of sheet material from container 104, examples of which include: currency, banknotes, tickets, vouchers, checks, and other commercial or governmentally issued monetary instruments. In some configurations, the sheets N of sheet material include sheets that contain input package identifiers, including a header card, a trailer card, a band strap image, and an input package barcode. In some configurations, reconciliation device and the sheet-accepting device are the same device. Examples of reconciling devices 301 include: currency-counting machines, check scanners, automated-teller machines, vending machines, ticket-redemption machines, change machines, table game bill acceptors, and other mechanisms that accept sheets N of value. In some configurations, reconciling device 301 includes one or more of sensors 302 and processing device 303. In some configurations, sheets N can be received from a container that holds all of sheets N together without separating sheets N.

In particular configurations, where container 104 is movable, container 104 can be loaded directly into reconciling device 301. In other such configurations, container 104 can facilitate loading of sheets N stored in container 104 into reconciling device 301.

Sensors 302 are configured to be in communication with reconciling device 301. Sensors 302 are configured to detect anomaly information about sheets N, including the reason that sheets N were rejected (e.g., deformed, torn, damaged in other ways, improperly-sized, folded, stuck to another sheet, missing elements, composed of unexpected materials or elements, counterfeit, unreadable by the machine, or that such information is unavailable). For example, sensors 302 can read markings (e.g., corresponding to anomaly information, accounting information, or deposit information) on a sheet to obtain information about the sheet. Sensors 302 can be configured to detect characteristic information about sheets N, including one or more of: serial numbers of sheets N, value or denomination information of sheets N, series of sheets N, physical attributes of sheets N, total number of sheets N or of particular groups of sheets N, the input package identifier, accounting information about the sheets N contained in the input package, and other identification, deposit, and accounting information related to sheets N. In some configurations, sensors are configured to detect only some of this information. In some configurations, sensors 302 are only one sensor. In some configurations, sensors 302 and sensors 102 are the same sensors. In other configurations, sensors 302 and sensors 102 are separate sensors. Examples of sensors 302 include one or more of: an optical sensor, a magnetic sensor, a RFID sensor, an ultraviolet sensor, and an infrared sensor.

In some configurations, sensors 302 are configured to capture the image of sheet N and record the image. In some configurations, sensors 302 are further configured to detect one or more of anomaly information and characteristic information about sheet N, including for example any unique identifiers associated with sheet N. For example, sensors 302 can capture the image of a currency object, the bar code printed on the currency object that identifies why the system rejected the currency object, and the serial number of the currency object. In some configurations, one or more of the image of sheet N, anomaly information encoded on sheet N, and characteristic information about sheet N are stored to a memory, for example in a database, and associated with the correct depositor's input package.

In some configurations, the anomaly information encoded on sheet N directly contains the depositor's input package information. In this configuration, if the anomaly information is read correctly during the reprocessing that includes the reconciling process, the system may use the depositor's input package information included in the anomaly information to perform the reconciling process.

Processing device 303 is configured to determine, based on the anomaly information detected by sensors 302, whether to reconcile an account associated with the accounting information about the sheet, detected by sensors 302. Processing device 303 is further configured to associate the accounting information about the sheet with the account in response to determining whether to reconcile the account. An account can be reconciled if the sheet is going to be disposed of or shredded, for example because the sheet is torn, glued to another sheet, heavily damaged, or counterfeit. Processing device 303 is further configured to reconcile the account associated with the accounting information based on the deposit information about the sheet. For example, reconciling the account may include crediting an account for a currency note or banknote because the note was in fact deposited but is too damaged for sensors 102 to read. As another example, reconciling the account may include crediting an account for a currency note or bank note by calculating the number of sheets that sensors 102 detected, determining based off the amount of money that should have been deposited into the account, and crediting the account based off of what denomination that note is. As another example, reconciling the account includes detecting the denomination of the currency note or bank note and crediting the account for that note. In some configurations, processing device 303 is configured to reconcile the account associated with the accounting information based on the characteristic information about the sheet, such as the serial number or value of the sheet. Thus, in this example, reconciling the account can include determining the denomination of a currency note or banknote and crediting the account for that amount of money. Examples of processing device 303 include one or more of: a processor, a computer, an accounting system, and accounting software.

In some configurations, one or more of sheet-accepting device 101, sensors 102, encoding device 103, container 104, reconciling device 301, sensors 302, and processing device 303 are linked by transport mechanisms such as belts, pneumatic conveyors, or other conveying mechanisms capable of transporting sheet materials such as currency notes between or within the devices. The transport path between each device can be short and straight to minimize the possibility of jamming or misfeeding. Open areas can be included in the transport paths to provide access to sheets and to permit imaging of both sides of a sheet.

In some other configurations, one or more of sheet-accepting device 101, sensors 102, encoding device 103, container 104, reconciling device 301, sensors 302, and processing device 303 are included within a single exterior housing having a display and an input device for inputting data or commands (not depicted). In yet other configurations, one or more of sheet-accepting device 101, sensors 102, encoding device 103, container 104, reconciling device 301, sensors 302, and processing device 303 are the same device.

In some configurations, sensors 302 can be configured to detect multiple forms of information about sheet N, including anomaly information and characteristic information about sheet N. For example, if a bar code identifying why a banknote was rejected cannot be detected by sensors 302, sensors 302 can detect characteristic information about sheet N, including for example the serial number of sheet N or the denomination of sheet N. In some configurations, processing device 303 can be configured to store to the memory, for example a database, the characteristic information about sheet N that sensors 302 detected, cross-referencing information or data already stored in the memory with the characteristic information about sheet N. In a further example, if a currency object could not be encoded because of a severe skew or multi-feed condition during the encoding process, then either a second unique identifier, for example a serial number or magnetic strip, of the currency object can be cross referenced to data detected and recorded from sheet N during the initial encoding process.

In some configurations, if sensors 302 cannot detect anomaly information about sheet N, processing device 303 can be configured to determine information about sheet N by associating sheet N with the sheet that was run through the system before sheet N or the sheet that was run through the system after sheet N. In some configurations, the information about the sheet before sheet N or the information about the sheet after sheet N can be stored to the memory, for example a database, and cross-referenced with sheet N. For example, if both anomaly information and characteristic information is missing from sheet N, perhaps because sheet N is too heavily damaged, the system can associate the anomaly information or characteristic information of either the sheet being processed immediately before or immediately following sheet N. If any input deposit identifying information of the sheets that are being processed immediately before sheet N and immediately after sheet N are the same, then the system can determine that sheet N's input deposit identifying information is also the same and associate the information with sheet N, for example by storing the information to a database.

In some configurations, if issues arise during the reconciling process, the system can read information associated with sheet N from the memory, for example a database, and that information can be used to reconcile the account. For example, in an unusual case, any information detected by sensors 302 about sheet N, including for example anomaly information, characteristic information, and input deposit identifier information, can be used to resolve any unusual reconciliation issues.

In some configurations, the reconciling process comprises reading one or more of an image of sheet N and characteristic information about sheet N from memory, for example a database, and associating the image of sheet N with the characteristic information about sheet N. For example, anomaly information or characteristic information about sheet N, for example the serial number of sheet N, detected by sensors 302 can be cross-referenced with other information about sheet N, for example image data, stored in memory. This process can allow the system to uniquely identify what deposit the rejected sheet originally was associated with, and maintain deposit integrity. Deposit integrity, generally speaking, refers to maintaining the correct physical count of the total currency objects and denominations or value of those objects that are contained within a customer's deposit.

In some configurations, the reconciling process can include reprocessing currency objects so that upon completion, every object from every deposit input package is fully accounted for in terms of quantity, for example number of sheets N, and value, for example the value of currency objects the deposit input package was said to contain when it was inputted into the system matches the value of currency objects actually being deposited. In some configurations, the reprocessing of sheet N can take place in a second processing pass through the system that encoded the sheet originally. In some configurations, the reprocessing of sheet N can take place in a separate system configured only to process rejected sheets N.

Figure 4:
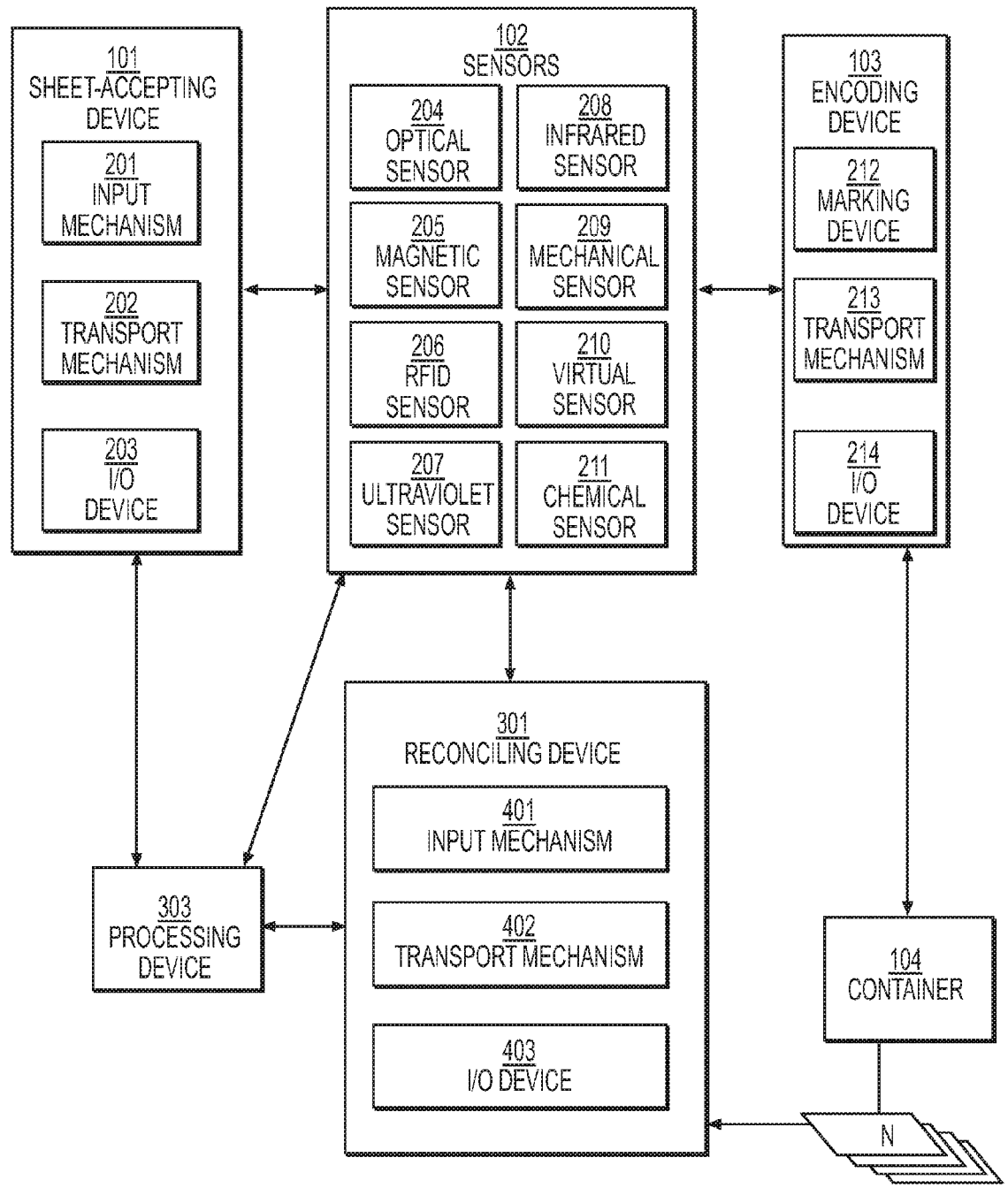
FIG. 4 is a schematic representation showing exemplary communications between a sheet-accepting device, a sensor, an encoding device, a container, a reconciling device, and a processing device in a virtual separator rejection-handling system according to particular embodiments.

FIG. 4 shows sheet-accepting device 101, sensors 102, encoding device 103, and container 104, as depicted in FIG. 1 and FIG. 2, and reconciling device 301, and processing device 303, and each device's ability to communicate with each other. Although FIG. 4 depicts certain configurations where reconciling device 301 communicates with sensors 102, it is understood that in various configurations, reconciling device 301 will communicate with sensors 302 separate from sensors 102, and the same functionality as that described below is also achieved in such configurations.

Reconciling device 301 includes an input mechanism 401 configured to receive a sheet N therein. In particular configurations, input mechanism 401 is a slot with rollers configured to transport sheets N inserted therein into reconciling device 301. Further, reconciling device 301 includes a transport mechanism 402, which may be a series of rollers or other elements able to transport a sheet N, configured to transport sheets N to sensors 302 (e.g., a second sensor) and processing device 303. In some configurations, sensors 302 and sensors 102 are the same sensors. In particular configurations, input mechanism 401 is configured to accept a plurality of sheets N at once and at least one of input mechanism 401 and transport mechanism 402 is configured to separate the plurality of sheets N, so that only one sheet N at a time is transported to sensors 302. In this manner, sensors 302 are able to accurately detect information of all of the plurality of sheets N. In some configurations, reconciling device 301 and sheet-accepting device 101 are the same device.

When transport mechanism 402 transports a sheet N to sensors 302, sensors 302 are configured to detect anomaly information about sheets N, including the reason that sheets N were rejected (e.g., that the sheet cannot be detected by sensors 302, or that the sheet is torn, folded, bent, stuck to another sheet, heavily damaged, or counterfeit). In some configurations, sensors 302 are configured to detect characteristic information about sheet N, including a serial number of sheet N and a value (e.g., denomination) of sheet N; as well as other information including, for example, a series of sheet N; physical attributes of sheet N including dimensions, weight, opacity, and texture; and the presence of other identifiers, such as magnetic strips, ink, bar codes or other recognition patterns, holograms, punch marks, and RFID circuits, or other marking mediums present on sheet N, including both visible marks and marks not visible to the human eye, including ultraviolet markings or infrared markings, reconciliation information about the sheet, including one or more of deposit information about sheet N, including how many sheets are associated with a particular account, and accounting information about sheet N, including what account an input package identifier is associated with, and other identification, deposit, and accounting information related to sheets N. In particular configurations, sensors 302 include one or more of: an optical sensor 204, a magnetic sensor 205, an RFID sensor 206, an ultraviolet sensor 207, an infrared sensor 208, a mechanical sensor 209, a virtual sensor 210, and a chemical sensor 211. Optical sensor 204 records an optical image of each sheet N, which is thereafter processed by processing device 303 or transmitted to another device for processing to extract at least a portion of the information of the sheet. In particular configurations, for example, processing device 303 is able to determine a combination of the anomaly information, reconciliation information including the accounting information and the deposit information, and the serial number and value of sheet N from the optical image of sheet N internally or at a remote device. In some configurations, sensors 302 include only one of optical sensor 204, magnetic sensor 205, RFID sensor 206, ultraviolet sensor 207, infrared sensor 208, mechanical sensor 209, virtual sensor 210, and chemical sensor 211. In other configurations, sensors 302 include various combinations of optical sensor 204, magnetic sensor 205, RFID sensor 206, ultraviolet sensor 207, infrared sensor 208, mechanical sensor 209, virtual sensor 210, and chemical sensor 211, and other sensors able to detect information of sheets N. In some configurations where a mark is not visible to the human eye, a special sensor designed for that special feature detection can be used to detect the mark.

After sensors 302 have detected the characteristic information encoded on sheet N or characteristic information about the sheet N indicating that sheet N is anomalous, processing device 303 is configured to determine whether to reconcile an account associated with the accounting information detected by sensors 302. In particular configurations, processing device 303 is further configured to determine, based on the anomaly information, whether to perform a reconciling process. The reconciling process associates accounting information about sheet N, which identifies an account that sheet N was intended to be deposited into, with the account. Once the account is known, the reconciling process credits the account. For example, the accounting information encoded on sheet N may include a bank account number or another unique identifier for a financial account, and the reconciling process would credit the bank account associated with that account number with the deposited money. For example, if a currency note is counterfeit and needs to be taken out of circulation and reported to the government, a bank may still want to credit the unknowing depositor's account for that note, thus preventing accounting discrepancies. As another example, if a currency note is so old or badly damaged that the note needs to be taken out of circulation or shredded, a bank may want to remove or shred the note, but still credit the unknowing depositor's account for that note, again preventing accounting discrepancies.

In some configurations, the reconciling process performed by processing device 303 credits the account based on deposit information about sheet N, including how many sheets N were deposited, how much money was intended to be deposited into the account, and other information about the group of sheets N that were deposited together. For example, in such configuration, the process may take the amount of money that was intended to be deposited, and the number of currency notes actually deposited, to determine what value the anomalous note is and credit the account for that amount. An illustration of that process is that, if the intended amount to be deposited is $500, but the total deposit received is $480, and one currency note is too damaged to be read, the reconciling process determines that the missing note is a $20 note and credit the account with the additional $20, to bring the deposit total to $500 and eliminate any account discrepancies.

In some configurations, the reconciling process performed by processing device 303 credits the account based on characteristic information about sheet N, including the value of sheet N. For example, in such a configuration, if a note that goes through a currency processing machine is torn and therefore rejected from the machine, the reconciling process uses the value of the note that was detected from the note to credit the account for the value of the note, eliminating any account discrepancies.

In some configurations, reconciling device 301 also includes an I/O device 403. I/O device 403 is configured to provide a communications interface between reconciling device 301 and other devices, particular databases, and other devices involved in monitoring, controlling, managing, accounting, and auditing processes.

Figure 5A:
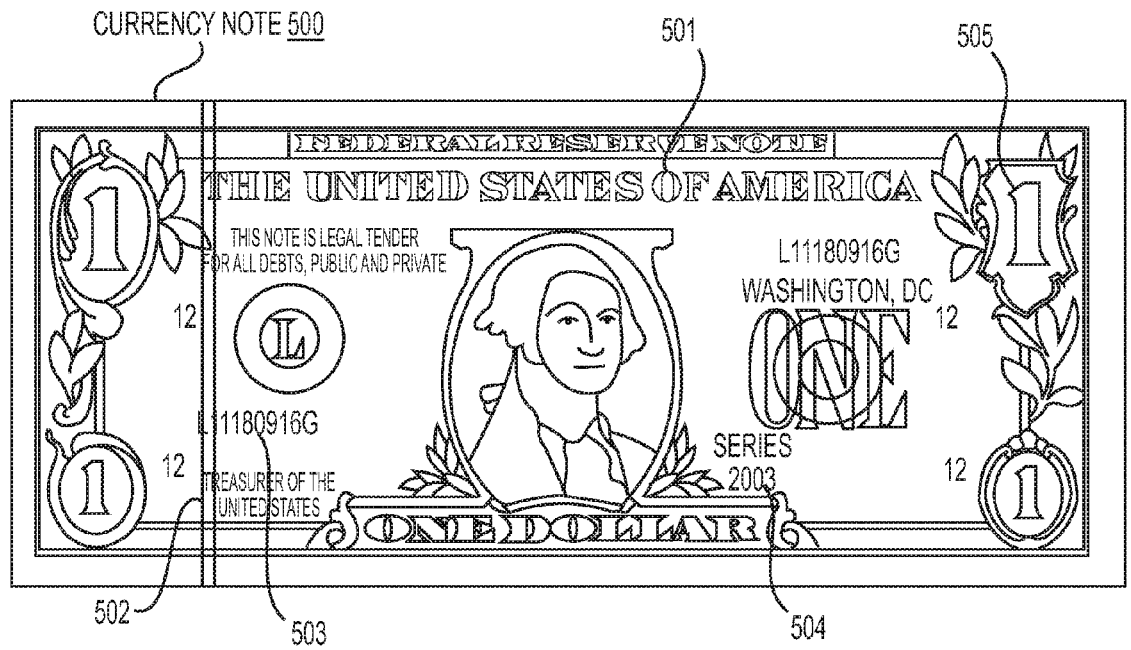
FIG. 5A is a schematic representation showing an exemplary currency note.

FIG. 5A shows an exemplary currency note 500. Currency note 500 includes a name of issuing government 501, a magnetic strip 502, a serial number 503, a series 504, and a value or denomination 505. Certain currency notes 500 include holograms and other characteristic markings. Serial number 503 is a unique number that uniquely distinguishes a currency note 500 from other currency notes 500 of the same denomination and series issued by the issuing government identified by name of issuing government 501. Further, magnetic strip 502 is encoded with information about currency note 500, which can include one or more of name of issuing government 501, serial number 503, series 504, and value or denomination 505. In some configurations, certain of elements 501-505, such as serial number 503 or denomination 505 are printed with magnetic ink. Moreover, currency note 500 can contain other markings or features that can provide additional information to sensors 302.

Figure 5B:
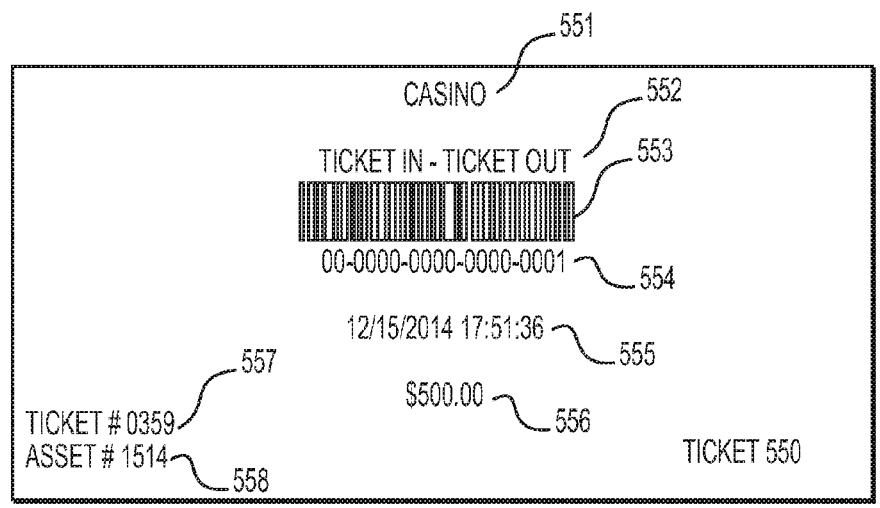
FIG. 5B is a schematic representation showing an exemplary commercial ticket.

FIG. 5B shows a Ticket In-Ticket Out ("TITO") ticket 550, which is an exemplary commercial ticket. Exemplary TITO ticket 550 includes a name of the issuing entity 551, a ticket identifier 552, a bar code 553, a serial number 554, a date and time of issuance 555, a value or denomination 556, a ticket number 557, and an asset number 558. Serial number 554 is a unique number that uniquely distinguishes a particular TITO ticket 550 from other circulating TITO tickets 550 issued by the issuing entity identified by name of issuing entity 551. In particular configurations, bar code 553 is a coded version of serial number 554. In some configurations, bar code 553 is a coded version of other information or a combination of information, such as, for example, some combination of elements 551-552 and 554-558. Asset number 558 corresponds to the device that issued TITO ticket 500. As depicted in FIG. 5B, ticket number 557 indicates that TITO ticket 550 was the 359th ticket issued by the device corresponding to asset number 1514. In some configurations, TITO ticket 550 is dimensioned similar to local currency to facilitate processing by sheet-accepting device 101. In other configurations, TITO ticket is dimensioned differently from the local currency so that TITO ticket 550 is readily distinguishable from the local currency. In particular configurations, certain of elements 551-558, such as serial number 554 or value 556, are printed with magnetic ink for the purpose of redundancy and to facilitate detection by sensors 302. Moreover, TITO ticket 550 may contain other markings or features that can provide additional information described above to sensors 302.

Figure 6:
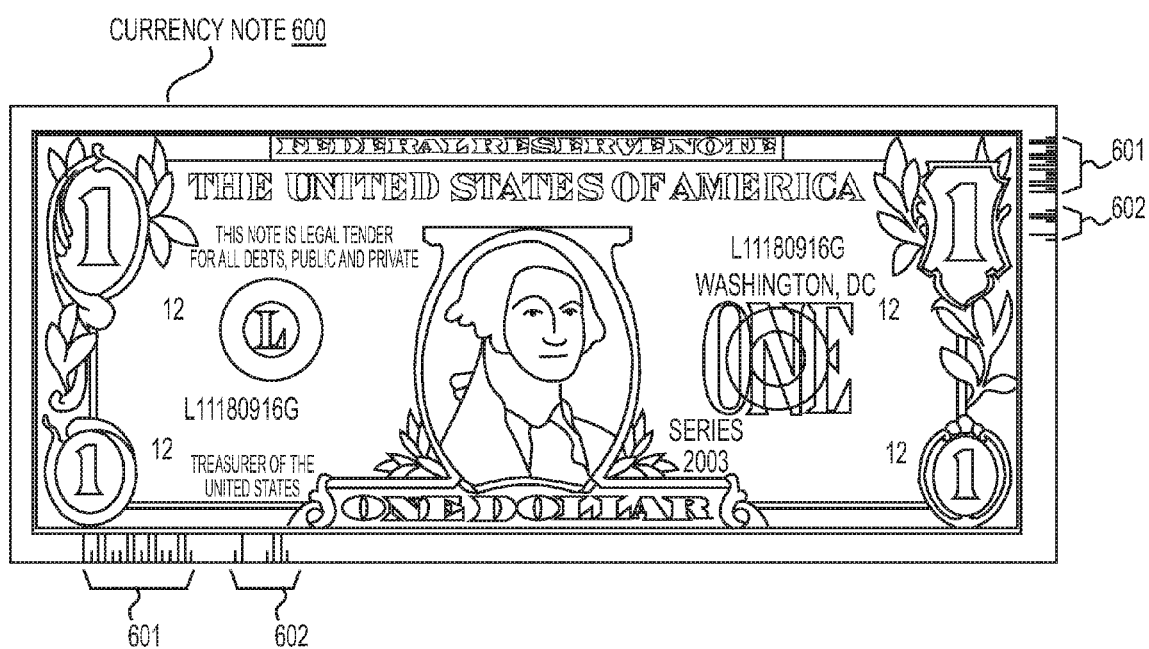
FIG. 6 is a schematic representation showing exemplary encoding on a side of an exemplary currency note.

FIG. 6 shows exemplary encoding of a short side an exemplary currency note 600, the exemplary currency note 600 having similar characteristics to those described above with respect to currency note 500. In particular configurations, encoding device 103 is configured to encode the currency note 600 with anomaly information 602, including, for example, the reason that currency note 600 was rejected by the system. In some configurations, encoding device 103 is configured to encode the currency note 600 with reconciliation information 601, including accounting information or deposit information about currency note 600. For example, currency note 600 may be encoded by marking, etching, embossing, embedding, engraving, printing, burning, or stamping.

In some configurations, encoding device 103 is configured to encode one or more instances of one side of currency note 600, including one of a short side, an intermediate side, and a long side. In some configurations, encoding device is configured to encode multiple sides of currency note 600. In some configurations, encoding device 103 is configured to encode multiple instances of the same side of currency note 600. In some configurations, encoding device 103 is configured to encode both a front side and a back side of currency note 600. The length of the encoding can vary, including the range of very short to very long.

Figure 7:
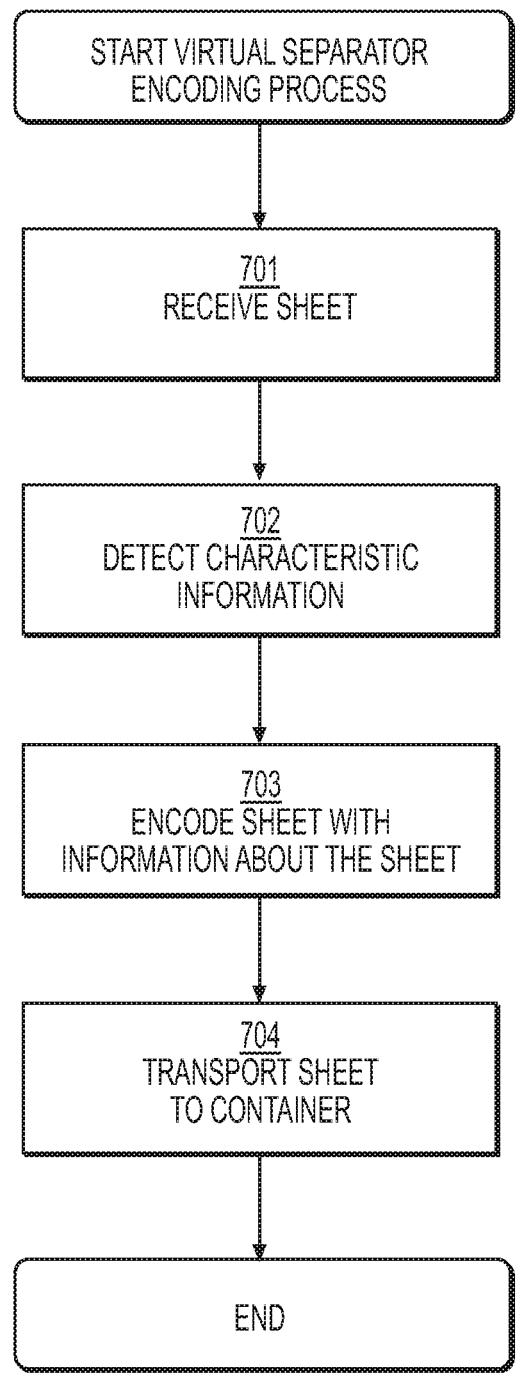
FIG. 7 is a flow chart showing an exemplary virtual separator encoding process performed by a virtual separator encoding system according to particular embodiments.

FIG. 7 shows a virtual separator encoding process performed by a sheet-accepting device 101, sensors 102, encoding device 103, and container 104. In step 701, input mechanism 201 in sheet-accepting devices 101 receives one or more sheets N inserted by, for example, a person or machine. In some configurations, one or more of input mechanism 201 and transport mechanism 202 separates sheets N when a plurality of sheets is inserted therein. Transport mechanism 202 transports sheet N to sensors 102.

In step 702, sensors 102 detect characteristic information about sheet N, including: a value or denomination of sheet N, such as value 505 of currency note 500 or value 556 of TITO ticket 550; a series or equivalent information of sheet N, such as series 504 of currency note 500 or asset number 558 of TITO ticket 550; a serial number of sheet N, such as serial number 503 of currency note 500 or serial number 554 of TITO ticket 550; physical attributes of sheet N, such the dimensions, texture, weight, and composition of currency note 500 or TITO ticket 550; other identifiers of sheet N, such as name of issuing entity 551, type of sheet 552, bar code 553, date of issue 555, and ticket number 557 of TITO ticket 550 or name of issuing government 501 and magnetic strip 503 of currency note 500; and reconciliation information about sheet N, including accounting information and deposit information. Further, sheet-accepting device 101 can store time and date information identifying the time and date each sheet N was inserted into input mechanism 201. In particular configurations, for example, sensors 102 detect portions of information of sheet N by one or more of capturing an optical image of sheet N with optical sensor 204 and performing optical character recognition processes and detecting magnetically encoded markings or features, such as magnetic strip 502 in currency note 500, and subsequently decoding the information encoded therein. In particular configurations, sheet-accepting device 101 performs such optical character recognition and decoding processes. In other configurations, such optical character recognition and decoding processes are performed by an external device. Transport mechanism 202 transports sheet N to encoding device 103.

In step 703, encoding device 103 encodes the sheet based on characteristic information about sheet N detected by sensors 102. Encoding device 103 encodes sheet N, using marking device 212, with anomaly information when the characteristic information about sheet N indicates that sheet N is anomalous. The anomaly information flags sheet N for further processing. In some configurations, encoding device 103 encodes sheet N, using marking device 212, with reconciliation information, including accounting information and deposit information. In some configurations, encoding device 103 applies a marking medium to both a first side of the sheet and a second side of the sheet. In step 704, transport mechanism 213 transports sheet N to container 204. In some configurations the anomaly information includes reconciliation information including one or more of the accounting information and the deposit information. The anomaly information can optionally include other information, such as a flag for further processing or information about the anomaly, in such configurations.

In some configurations, encoding the sheet comprises storing to a memory one or more of: the characteristic information about the sheet, including the serial number and value of the sheet; the anomaly information about the sheet, including the reason that the system rejected sheet N as anomalous; the accounting information about the sheet, including the account that the deposit was intended for; the deposit information about the sheet, including the number of sheets N deposited in the group of sheets N deposited; image data of an image of the sheet; and metadata of the image of the sheet. In some configurations, the memory comprises a database or database system stored in a memory.

In some configurations, container 104 can have one or more compartments. The compartments can be used to each contain a particular group of sheets with particular anomaly information. In these configurations, the virtual separator encoding process can further comprise the step of sorting sheet N into one of the compartments based on the anomaly information detected by the first sensor. For example, container 104 may have separate compartments for counterfeit currency and damaged currency. In some configurations, container 104 can be a system of containers. The containers can be used to each contain a particular group of sheets with particular anomaly information. In these configurations, the virtual separator encoding process can further comprise the step of sorting sheet N into one of the containers 104 in the system of containers based on the anomaly information detected by the first sensor. For example, container 104 may have separate containers for counterfeit currency and damaged currency.

Figure 8:
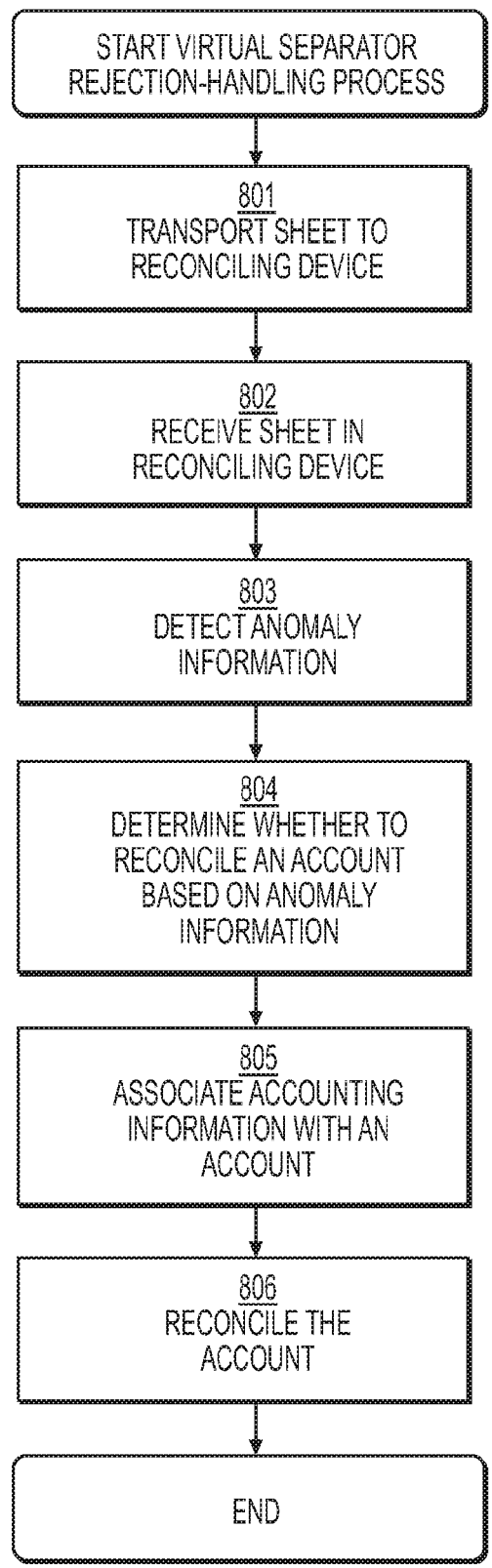
FIG. 8 is a flow chart showing an exemplary virtual separator reconciling process performed by a virtual separator reconciliation system, according to particular embodiments.

FIG. 8 shows a virtual separator reconciling process/rejection handling performed by reconciling device 301, sensors 302, and processing device 303. In step 801, transport mechanism 402 transports sheet N to reconciling device 301. In step 802, input mechanism 401 in reconciling device 301 receives one or more sheets N inserted by a person or machine. In some configurations, one or more of input mechanism 401 and transport mechanism 402 separates sheets N when the person or machine inserts a plurality of sheets. Transport mechanism 402 transports each sheet to either sensors 102 or sensors 302, depending on the configuration.

In step 803, sensors 302 detect anomaly information, which can include, for example, the reason that sheet N was rejected. For example, sensors 302 detect anomaly information 602 about currency note 600. In some configurations, sensors 302 detect reconciliation information, including accounting information and deposit information about the sheet. For example, sensors 302 detect reconciliation information 601 about currency note 600. In some configurations, sensors 302 detect characteristic information about sheet N, including: a serial number of sheet N and a value (e.g., denomination) of sheet N; a series of sheet N; physical attributes of sheet N; and the presence of other identifiers, such as magnetic strips, ink, bar codes or other recognition patterns, holograms, punch marks, and RFID circuits, or other marking mediums present on sheet N, including both visible marks and marks not visible to the human eye, including ultraviolet markings or infrared markings. Transport mechanism 402 transports each sheet to processing device 303.

In step 804, processing device 303 determines, based on the anomaly information detected by sensors 302, whether to reconcile an account associated with the accounting information about the sheet, detected by sensors 302. In step 805, processing device 303 associates the accounting information about the sheet with the account in response to determining that the account is to be reconciled.

In step 806, processing device 303 reconciles the account associated with the accounting information based on the deposit information about the sheet. In some configurations, processing device 303 is configured to reconcile the account associated with the accounting information based on the characteristic information about the sheet obtained by sensors 302, including for example the serial number or value of the sheet.

In some configurations, one or more of steps 801-806 comprises reading from a memory one or more of: the characteristic information about the sheet, including the serial number and value of the sheet; the anomaly information about the sheet, including the reason that the system rejected sheet N as anomalous; the accounting information about the sheet, including the account that the deposit was intended for; the deposit information about the sheet, including the number of sheets N deposited in the group of sheets N deposited; image data of an image of the sheet; and metadata of the image of the sheet. In some configurations, the information and data will be read from a database system. In some configurations, the information and data will be linked in the memory or database system such that processing device 303 can access one piece of information or data and know where in memory or the database system to find the linked accounting information, which can include an account number. Processing device 303 uses the information or data read from the memory or database system to reconcile the account.

Figure 9:
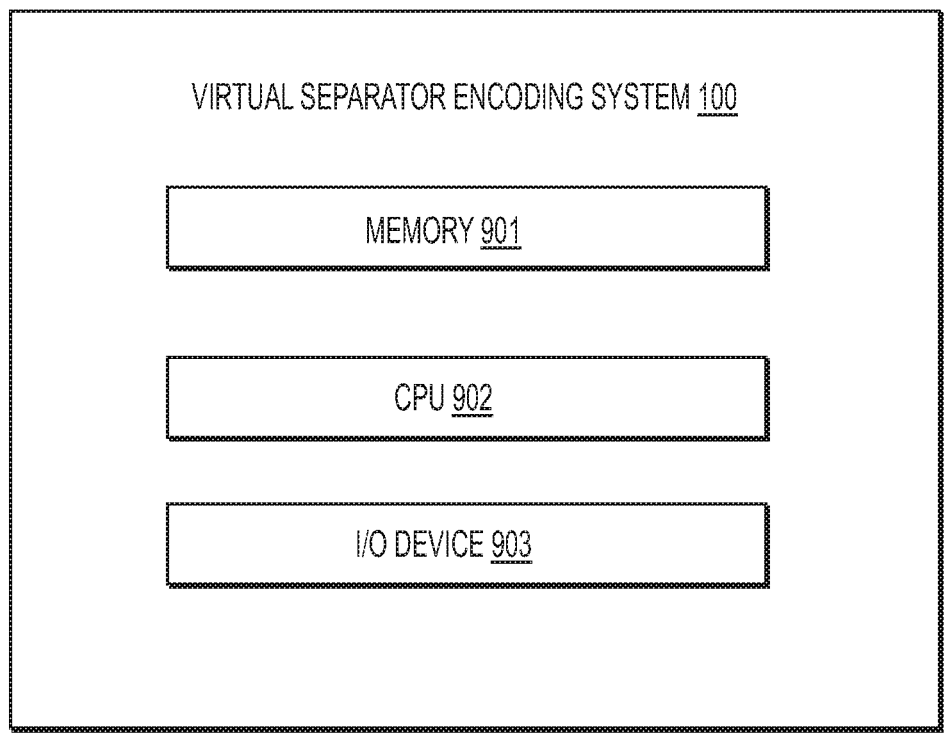
FIG. 9 is a schematic representation showing a virtual separator encoding system according to particular embodiments.

FIG. 9 shows an exemplary system 900 for processing a sheet of sheet material. System 900 includes one or more of: a memory 901, a CPU 902, and an I/O device 903. Memory 901 can store computer-readable instructions that can instruct CPU 902 to perform certain processes. Memory 901 may comprise, for example, random access memory ("RAM"), read-only memory ("ROM"), erasable programmable read-only memory ("EPROM"), an electronically erasable programmable read-only memory ("EEPROM"), Flash memory, or any suitable combination thereof. When executed by CPU 902, the computer-readable instructions stored in memory 901 instruct CPU 902 to operate as one or more devices configured to perform particular functions. In certain configurations, memory 901 stores computer-readable instructions for performing any and all functions or processes described herein, and CPU 902 executes such computer-readable instructions and operate as one or more devices configured to perform or control such functions or processes.

Figure 10:
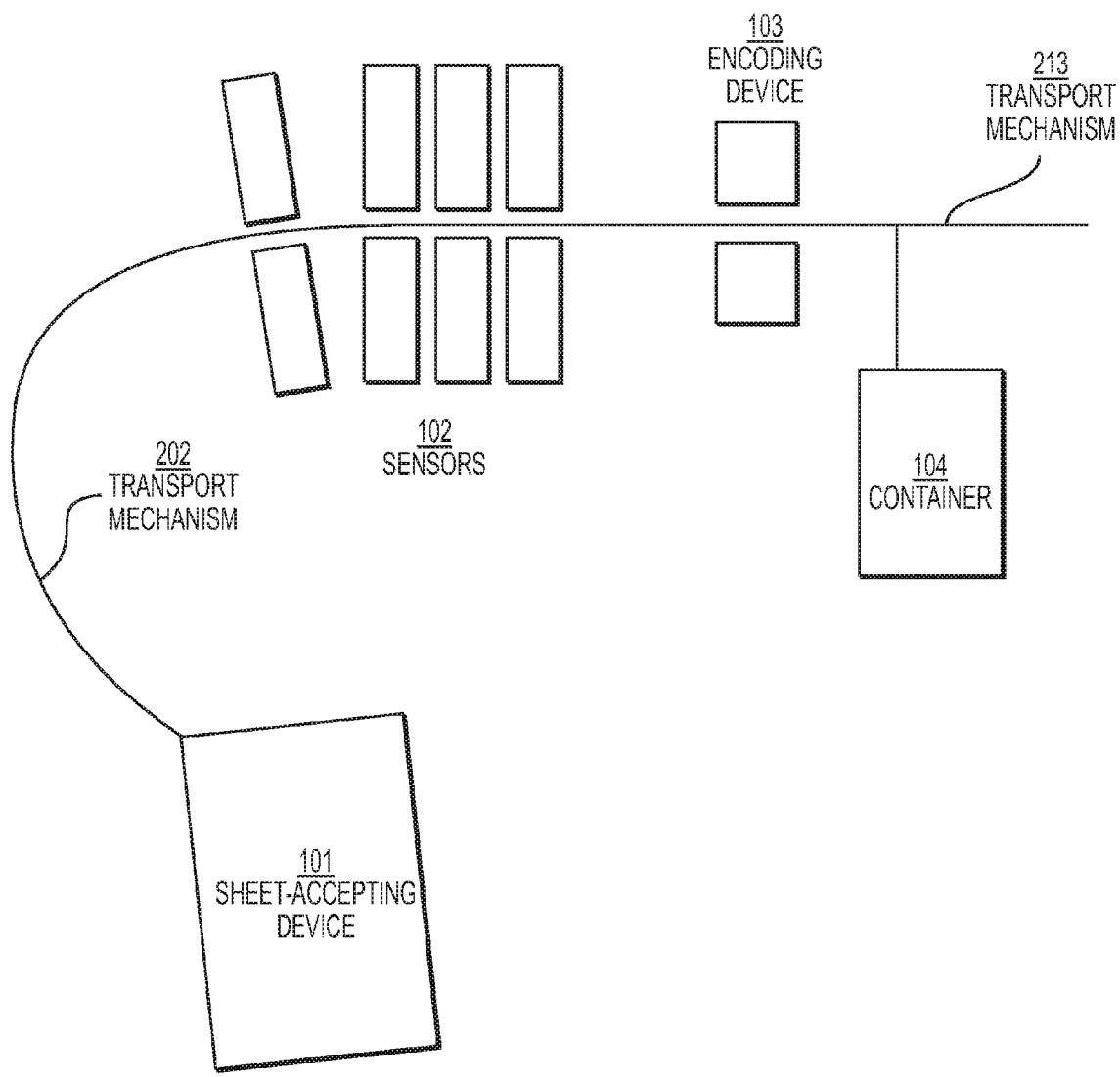
FIG. 10 is a schematic representation showing a virtual separator encoding system according to particular embodiments.

FIG. 10 shows an exemplary virtual separator encoding system 100, comprising sheet-accepting device 101, with transport mechanism 202, sensors 102, encoding device 103, transport mechanism 213, and container 104.

CPU 902 is configured to execute the computer-readable instructions stored in memory 901 so that the computer-readable instructions instruct CPU 902 to perform or control a plurality of processes including, but not limited to, one or more of the processes described with respect to FIGS. 7 and 8 and any other process described herein. Accordingly, CPU 902 can be configured to perform a variety of processes, as discussed in more detail below. CPU 902 may be, for example, a processor, a controller, an application specific integrated circuit ("ASIC"), or a system comprising a plurality of processors, controllers, or ASICs.

As shown in FIG. 9, I/O device 903 is configured to receive one or more of data from sheet-accepting device 101, data from one or more other devices from reconciling device 301, and input from a user and provide such information to CPU 902 and/or memory 901. I/O device 903 is configured to transmit data to one or more external devices in order to transmit or otherwise render information to a user (e.g., display the information or indicators thereof, provide audible indications of such information). I/O device 903 may include, for example, one or more of a transceiver, a modem, a network card, a transmitter, a receiver, a microphone, a speaker, an antenna, a light-emitting diode ("LED"), a display device, or any other device configured to provide or receive information.

Any combination of one or more computer-readable storage media is suitable. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a RAM, a ROM, an EPROM, an EEPROM, a Flash memory, an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

While the invention has been described in connection with various exemplary structures and illustrative embodiments, it will be understood by those skilled in the art that other variations and modifications of the structures, configurations, and embodiments described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A system configured to process one or more of a plurality of sheets of sheet material in a deposit, the system comprising:
   a sheet-accepting device configured to receive one or more sheet of the plurality of sheets;
   one or more sensors configured to detect characteristic information about the one or more sheet, the characteristic information indicating whether the one or more sheet is anomalous;
   an encoding device configured to encode the one or more sheet based on the characteristic information detected by the one or more sensors,
   the encoding device configured to encode the one or more sheet with:
      anomaly information when the characteristic information indicates that the one or more sheet is anomalous, and the anomaly information identifying a reason for indicating that the one or more sheet is anomalous;
      accounting information about the one or more sheet, the accounting information identifying an account associated with the deposit; and
      deposit information about the one or more sheet, the deposit information comprising information about the plurality of sheets in the deposit, the information about the plurality of sheets in the deposit including a value associated with the deposit;
   a memory configured to store the anomaly information for the one or more sheet and the one or more of the accounting information about the one or more sheet and the deposit information about the one or more sheet; and
   a container configured to receive the encoded one or more sheet therein for further processing when the characteristic information indicates that the one or more sheet is anomalous,
   wherein the encoding device is configured to not encode a particular sheet of the plurality of sheets when the characteristic information indicates that the particular sheet is not anomalous.

2. The system according to claim 1,
   wherein the characteristic information detected by the one or more sensors includes a serial number of each of the one or more sheet,
   wherein, when the characteristic information indicates that the one or more sheet is anomalous, the encoding device is further configured to store the serial number of each of the one or more sheet in the memory, wherein the encoding device is configured to encode the one or more sheet with the anomaly information by storing, for each sheet of the one or more sheet, the anomaly information of the sheet in the memory in association with the serial number of the sheet, wherein the encoding device is configured to encode the one or more sheet with the accounting information about the one or more sheet by storing, for each sheet of the one or more sheet, the accounting information about the sheet in the memory in association with the serial number of the sheet, and wherein the encoding device is configured to encode the one or more sheet with the deposit information about the one or more sheet by storing, for each sheet of the one or more sheet, the deposit information about the sheet in the memory in association with the serial number of the sheet.

3. The system according to claim 1, wherein the encoding comprises at least one marking that is linked to the anomaly information of the sheet and the one or more of the accounting information about the sheet and the deposit information about the sheet stored in the memory.

4. The system according to claim 1, wherein, when the characteristic information indicates that the one or more sheet is anomalous, the one or more sensors is configured to store an image of each of the one or more sheet in the memory, wherein the encoding device is configured to encode the one or more sheet with the anomaly information by associating, for each sheet of the one or more sheet, the image of the sheet stored in the memory with the anomaly information of the sheet, and wherein the encoding device is configured to encode the one or more sheet with the accounting information about the one or more sheet by associating, for each sheet of the one or more sheet, the image of the sheet stored in the memory with the accounting information about the sheet, and wherein the encoding device is configured to encode the one or more sheet with the deposit information about the one or more sheet by associating, for each sheet of the one or more sheet, the image of the sheet stored in the memory with the deposit information about the sheet.

5. The system according to claim 1, wherein the container is configured to receive only encoded sheets.

6. A method for processing one or more of a plurality of sheets of sheet material in a deposit, the method comprising:

receiving one or more sheet of the plurality of sheets in a sheet-accepting device;

detecting, by one or more sensors, characteristic information about the one or more sheet, the characteristic information indicating whether the one or more sheet is anomalous;

encoding, by an encoding device, the one or more sheet based on the characteristic information detected by the one or more sensors, the encoding the one or more sheet comprising encoding the one or more sheet with:

anomaly information when the characteristic information indicates that the one or more sheet is anomalous, and the anomaly information identifying a reason for indicating that the one or more sheet is anomalous;

accounting information about the one or more sheet, the accounting information identifying an account associated with the deposit; and deposit information about the one or more sheet, the deposit information comprising information about the plurality of sheets in the deposit, the information about the plurality of sheets in the deposit including a value associated with the deposit;

storing the anomaly information for the one or more sheet and the one or more of the accounting information about the one or more sheet and the deposit information about the one or more sheet in a memory when the characteristic information indicates that the one or more sheet is anomalous; and disposing the encoded one or more sheet in a container for further processing when the characteristic information indicates that the one or more sheet is anomalous, wherein the encoding device does not perform the encoding step on a particular sheet of the plurality of sheets when the characteristics information indicates that the particular sheet is not anomalous.

7. The method according to claim 6, wherein the characteristic information detected by the one or more sensors includes a serial number of each of the one or more sheet, wherein, when the characteristic information indicates that the one or more sheet is anomalous, the method further comprises storing the serial number of each of the one or more sheet in the memory, and wherein, when the characteristic information indicates that the one or more sheet is anomalous, the encoding the one or more sheet further comprises:

storing, for each sheet of the one or more sheet, the anomaly information of the sheet in the memory in association with the serial number of the sheet, storing, for each sheet of the one or more sheet, the accounting information about the sheet in the memory in association with the serial number of the sheet, and storing, for each sheet of the one or more sheet, the deposit information about the sheet in the memory in association with the serial number of the sheet.

8. The method according to claim 6, wherein the encoding comprises at least one marking that is linked to the anomaly information of the sheet and the one or more of the accounting information about the sheet and the deposit information about the sheet stored in the memory.

9. The method according to claim 6, further comprising:

storing, when the characteristic information indicates that the one or more sheet is anomalous, an image of each of the one or more sheet in the memory, wherein, when the characteristic information indicates that the one or more sheet is anomalous, the encoding the one or more sheet further comprises:

associating, for each sheet of the one or more sheet, the image of the sheet stored in the memory with the anomaly information of the sheet, and associating, for each sheet of the one or more sheet, the image of the sheet stored in the memory with the accounting information about the sheet, and associating, for each sheet of the one or more sheet, the image of the sheet stored in the memory with the deposit information about the sheet.

10. The method according to claim 6, wherein only encoded sheets are disposed in the container.

11. A non-transitory, computer-readable medium storing computer-readable instructions that, when executed by at least one processor, instruct the at least one processor to control processes for processing one or more of a plurality of sheets of sheet material in a deposit, the processes comprising:
   receiving one or more sheet of the plurality of sheets in a sheet-accepting device;
   detecting, by one or more sensors, characteristic information about the one or more sheet, the characteristic information indicating whether the one or more sheet is anomalous;
   encoding, by an encoding device, the one or more sheet based on the characteristic information detected by the one or more sensors,
      the encoding the one or more sheet comprising encoding the one or more sheet with:
         anomaly information when the characteristic information indicates that the one or more sheet is anomalous, and the anomaly information identifying a reason for indicating that the one or more sheet is anomalous;
         accounting information about the one or more sheet, the accounting information identifying an account associated with the deposit; and
         deposit information about the one or more sheet, the deposit information comprising information about the plurality of sheets in the deposit, the information about the plurality of sheets in the deposit including a value associated with the deposit;
   storing the anomaly information for the one or more sheet and the one or more of the accounting information about the one or more sheet and the deposit information about the one or more sheet in a memory when the characteristic information indicates that the one or more sheet is anomalous; and
   disposing the encoded one or more sheet in a container for further processing when the characteristic information indicates that the one or more sheet is anomalous,
   wherein the encoding process is not performed on a particular sheet of the plurality of sheets when the characteristic information indicates that the particular sheet is not anomalous.

12. The non-transitory, computer-readable medium according to claim 11,
   wherein the characteristic information detected by the one or more sensors includes a serial number of each of the one or more sheet,
   wherein the computer-readable instructions, when executed by the at least one processor, further instruct the at least one processor to control processes comprising storing the serial number of each of the one or more sheet in the memory when the characteristic information indicates that the one or more sheet is anomalous, and
   wherein, when the characteristic information indicates that the one or more sheet is anomalous, the encoding the one or more sheet further comprises:
      storing, for each sheet of the one or more sheet, the anomaly information of the sheet in the memory in association with the serial number of the sheet,
      storing, for each sheet of the one or more sheet, the accounting information about the sheet in the memory in association with the serial number of the sheet, and
      storing, for each sheet of the one or more sheet, the deposit information about the sheet in the memory in association with the serial number of the sheet.

13. The non-transitory, computer-readable medium according to claim 11, wherein the encoding comprises at least one marking that is linked to the anomaly information of the sheet and the one or more of the accounting information about the sheet and the deposit information about the sheet stored in the memory.

14. The non-transitory, computer-readable medium according to claim 11,
   wherein the computer-readable instructions, when executed by the at least one processor, further instruct the at least one processor to control processes comprising storing an image of each of the one or more sheet in the memory when the characteristic information indicates that the one or more sheet is anomalous, and
   wherein, when the characteristic information indicates that the one or more sheet is anomalous, the encoding the one or more sheet further comprises:
      associating, for each sheet of the one or more sheet, the image of the sheet stored in the memory with the anomaly information of the sheet, and
      associating, for each sheet of the one or more sheet, the image of the sheet stored in the memory with the accounting information about the sheet, and
   associating, for each sheet of the one or more sheet, the image of the sheet stored in the memory with the deposit information about the sheet.

15. The non-transitory, computer-readable medium according to claim 11, wherein only encoded sheets are disposed in the container.

* * * * *